(12) United States Patent
Leatherwood

(10) Patent No.: US 11,964,701 B2
(45) Date of Patent: Apr. 23, 2024

(54) COLLAPSIBLE RACK FOR A TRUCK BED

(71) Applicant: Eric Leatherwood, Boyd, CA (US)

(72) Inventor: Eric Leatherwood, Boyd, CA (US)

( * ) Notice: Subject to any disclaimer, the term of this patent is extended or adjusted under 35 U.S.C. 154(b) by 211 days.

(21) Appl. No.: 17/742,386

(22) Filed: May 11, 2022

(65) Prior Publication Data
US 2023/0365198 A1 Nov. 16, 2023

(51) Int. Cl.
*B62D 33/02* (2006.01)
(52) U.S. Cl.
CPC ................................ *B62D 33/0207* (2013.01)
(58) Field of Classification Search
CPC .. B62D 33/0207; B62D 33/02; B62D 33/023; B62D 33/027; B62D 33/03; B60R 9/06
USPC .......................................................... 224/405
See application file for complete search history.

(56) References Cited

U.S. PATENT DOCUMENTS

| | | | |
|---|---|---|---|
| 3,891,262 A * | 6/1975 | Brunel | B60P 7/06 296/3 |
| 5,002,324 A | 3/1991 | Griffin | |
| 5,152,570 A * | 10/1992 | Hood | B60R 9/00 296/3 |
| 5,242,094 A | 9/1993 | Finley | |
| 5,454,612 A | 10/1995 | Christensen | |
| 5,836,635 A | 11/1998 | Dorman | |
| 6,332,637 B1 * | 12/2001 | Chambers | B62D 33/08 296/3 |
| 6,457,619 B1 | 10/2002 | Werner et al. | |
| 6,644,704 B1 | 11/2003 | Nyberg | |
| 7,419,075 B2 | 9/2008 | Green | |
| 7,464,977 B1 | 12/2008 | Price | |
| 7,758,091 B1 * | 7/2010 | McCall | B60P 3/40 296/3 |
| 8,100,306 B2 * | 1/2012 | Gerhardt | B60R 9/045 224/539 |
| 8,403,191 B2 | 3/2013 | Russo | |
| 8,668,125 B2 * | 3/2014 | Williams | B60R 9/06 224/403 |
| 8,777,288 B2 * | 7/2014 | Johnasen | B60R 9/08 296/3 |
| 9,718,391 B1 | 8/2017 | Oxley et al. | |
| 10,131,287 B1 * | 11/2018 | Marino | B60R 9/045 |
| 10,358,170 B2 | 7/2019 | Condon et al. | |
| 11,072,376 B2 | 7/2021 | Condon et al. | |
| 11,541,948 B2 * | 1/2023 | Condon | B60R 9/06 |
| 2002/0125728 A1 * | 9/2002 | Chambers | B62D 33/08 296/3 |
| 2003/0201656 A1 * | 10/2003 | Ferguson | B60P 3/40 296/3 |
| 2008/0203695 A1 | 8/2008 | Bell | |
| 2009/0026784 A1 | 1/2009 | Green | |

(Continued)

*Primary Examiner* — Peter N Helvey
(74) *Attorney, Agent, or Firm* — Kenneth Avila

(57) ABSTRACT

Disclosed is a collapsible rack assembly for pickup trucks to aid in the storage and transportation of material that is greater than the length of the pickup truck's rear cargo area bed. A base frame, being primarily hollow, tubular, and rectangular in shape, is mounted to the pickup truck's rear cargo area bed. Legs are hingedly attached at each inside corner of the base frame to support a crossbeam assembly to which ladders and other long loads may be attached thereto. The entire rack assembly may be collapsed into a single layer to minimize the amount of space the rack assembly occupies in the pickup truck's rear cargo area bed.

7 Claims, 11 Drawing Sheets

(56) References Cited

U.S. PATENT DOCUMENTS

| | | |
|---|---|---|
| 2010/0072237 A1 | 3/2010 | Green |
| 2011/0186610 A1 | 8/2011 | Russo |
| 2014/0191527 A1 | 7/2014 | Riley |
| 2015/0048127 A1 | 2/2015 | Sutton et al. |
| 2015/0258940 A1* | 9/2015 | Breeden, III ........... B60R 9/045 224/405 |
| 2016/0159290 A1 | 6/2016 | Tamaddon-Dallal et al. |
| 2018/0154817 A1* | 6/2018 | Chambers ............ B62D 33/023 |

* cited by examiner

COLLAPSIBLE RACK FOR A TRUCK BED

CROSS-REFERENCE TO RELATED APPLICATIONS

This application claims priority from U.S. Provisional Patent Application No. 63/159,447 filed on Mar. 11, 2021. The entire disclosure of the prior application is considered to be part of the disclosure of the accompanying application and is hereby incorporated by reference.

BACKGROUND OF THE INVENTION

1. Field of the Invention

This invention is related to utility rack assemblies for pick-up truck cargo beds and the like to support the transport of articles of a length longer than the pick-up truck's cargo bed. More particularly, such rack assemblies that are mounted to the pick-up truck's cargo bed and may be configured either in a folded or an unfolded position.

2. Description of the Related Art

Pickup trucks are popular vehicles, especially for construction workers, because such vehicles support a rear cargo area bed that is suitable to carry a variety of materials. Typically materials include tools, equipment, construction materials, and more. Pickup trucks are also purchased by individuals to carry larger recreational equipment such as motorcycles, bicycles, kayaks, and more. Although the rear cargo area bed is suitable to carry a variety of materials, some materials may be longer than the rear cargo area bed. For construction workers, plumbing or landscaping pipes, ladders, posts, and other long materials may not fit within the rear cargo area bed. For recreational users, it may be difficult to transport kayaks or surfboards within the rear cargo area bed. Many users, when confronted with the transport of elongated or oversized materials such as long ladders, canoes, pipes, lumber, or metal, the use of a rack assembly in the rear cargo area bed that elevates above the height of the pickup truck cab is almost a necessity to prevent these materials from substantially extending beyond the rear of the vehicle.

Rack assemblies for pickup trucks have been the subject of much prior art. The first class of rack assemblies is mounted onto the sidewalls of the rear cargo area bed. The U.S. Pat. No. 11,072,376 titled "Truck-mountable cargo rack" to Condon et al is an example of such a rack assembly. Another example is the United States patent publication 2015/0258940 titled "Folding Ladder Rack" to Breeden et al. An advantage of such rack assemblies is that the rear cargo area bed is not utilized leaving this entire space available for other purposes. However, many pickup truck owners dislike such rack assemblies because such assemblies distract from the clean look of their pickup trucks. Additionally, mounting such assemblies requires modification to the sidewalls of the rear cargo area bed, and many times such modifications are visible to the casual user observing the pickup truck.

The second class of rack assemblies is those that are mounted onto the rear cargo area bed itself. Examples of such assemblies include U.S. Pat. No. 8,403,191 titled "Pickup Ladder Rack" to Russo or the U.S. Pat. No. 5,836,635 titled "Knockdown truck rack apparatus and method" to Dorman. These rack assemblies are mounted to the rear cargo area bed close to each of the sidewalls that exist to the left and to the right of the rear cargo area bed. This will maximize the amount of space within the rear cargo area bed to carry materials. Although such rack assemblies do not disturb the look of the rear cargo area bed sidewalls, because they are not mounted on the sidewalls themselves, they still distract from the look of the pickup truck when assembled. Some prior art discloses rack assemblies that mount to the rear cargo area bed and are foldable so that they retract away from the view of the casual observer. Examples of such prior art include the U.S. Pat. No. 6,644,704 titled "Extendable truck rack" to Nyberg and U.S. Pat. No. 3,891,262 titled "Folding carrier rack for pick-up trucks" to Brunel. However, such assemblies do not entirely fold away onto the rear cargo area bed as in the Nyberg disclosure (see FIG. 1) or the components of the rack assembly stack with one another when in its folded position as with the U.S. Pat. No. 6,457,619 titled "Truck bed mounted surfboard storage rack" to Werner et al (see FIG. 6).

What is needed, therefore, is a rack assembly suitable for use with pickup trucks that may be easily folded into a collapsed position so as not to be visible to the casual viewer; foldable to a single layer to facilitate the loading of the material above it; adjustable to fit within the entire length of the rear cargo area bed; relatively lightweight for ease of installation, removal, storage and shipping; and of sufficient strength to carry desired loads and items on the rack.

BRIEF SUMMARY OF THE INVENTION

The rack assembly for pickup trucks of the present invention solves the problems and provides the benefits identified above. That is to say, the present invention discloses a rack assembly for pickup trucks that is relatively quick and easy to install on and remove from a pickup truck's rear cargo area bed and configurable to carry the desired elongated loads on the rack assembly. The rack assembly of the present invention is adaptable to a wide range of widths and lengths of a pickup truck's rear cargo area bed. When the rack assembly of the present invention is folded into its collapsed configuration it will only occupy a single plane, that is no components are stacked one upon the other.

The rack assembly of the present invention comprises a rectangular frame, formed from two halves, that is attached to the floor of the rear cargo area bed. One of the halves, the proximal half, is found close to the pickup truck's cab and the distal half is found opposite the proximal half. The two halves are lengthwise slidable within each other thus allowing the length of the rectangular frame to adjust to the length of the rear cargo area bed. Both at the proximal and the distal end of the rectangular frame and hinged thereto are four legs, two at the proximal end and two at the distal end of the rectangular frame. The proximal end of the legs is hinged to the rectangular frame while the distal end of each pair of legs is connected together by a crossbar. Each pair of legs are formed from two halves, each half being lengthwise slidable within each other thus allowing the length of each pair of legs to be adjustable. Within the hollow crossbars connecting the distal ends of each pair of legs may be found arm extensions, two arm extensions within each crossbar. The arm extensions may be drawn out of the crossbars. Materials being carried by the rack assembly of the present invention, when it is in its expanded configuration, may be positioned on the crossbar, arm extensions, or both. As stated above, the proximal ends of each pair of legs are hingeably attached to the rectangular frame. When the legs are in their collapsed configuration and the arm extensions are positioned within the crossbar, the legs and the rectangular frame are on the same plane, that is they are not stacked on top of each other. When the legs moved into their expanded configuration, they are supported by a triangular brace with each leg having its own triangular brace. The triangular braces are hingeably attached to a flange that is in turn attached to the rectangular frame. When a triangular brace is in its collapsed configuration, it is in the same plane as the rectangular frame. Moreover, as the triangular brace is folded into its collapsed configuration and away from the rectangular frame, a channel is exposed allowing the legs, when they are folded into their collapsed position, to lie in the same plane as the rectangular frame and triangular braces.

Accordingly, the primary objective of the present invention is to provide an improved rack assembly for pickup trucks and the like that provides the advantages discussed above and overcomes the disadvantages associated with presently available pickup truck racks.

It is also an important objective of the present invention to provide a rack assembly that when it is in its collapsed configuration, none of the components of the rack assembly is stacked upon another component. That is all of the components lie in the same plane.

It is also an important objective of the present invention to provide a rack assembly that when it is in its collapsed configuration, it is not visible to the casual observer.

It is also an important objective of the present invention to provide a rack assembly that may be quickly and easily changed from its collapsed configuration to its expanded configuration and vice versa.

It is also an important objective of the present invention to provide a rack assembly that may be quickly and easily disassembled for ease of installing, removing, storing, and shipping the rack assembly.

It is also an important objective of the present invention to provide a rack assembly that is configured to carry the desired loads and resist the load and shear forces from those loads while utilizing relatively lightweight materials for the rack frame components.

It is also an important objective of the present invention to provide a rack assembly that is adaptable to a wide range of rear cargo area bed sizes.

The above and other objectives of the present invention will be explained in greater detail by reference to the attached figures and the description of the preferred embodiment which follows. As set forth herein, the present invention resides in the novel features of form, construction, mode of operation, and combination of processes presently described and understood by the claims. Neither this summary nor the following detailed description defines or limits the invention. The invention is defined by the claims.

BRIEF DESCRIPTION OF DRAWINGS

The present invention will become more fully understood from the detailed description and accompanying drawings. Other systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims. Component parts shown in the drawings are not necessarily to scale and may be exaggerated to better illustrate the important features of the invention. Dimensions disclosed or shown are exemplary only. In the drawings, like reference numerals may designate like parts throughout the different views, wherein:

DETAILED DESCRIPTION OF THE INVENTION

The following description of the preferred embodiment(s) is merely exemplary in nature and is in no way intended to limit the invention, its application, or its uses. The foregoing problems associated with rack assemblies are overcome by the assembly disclosed herein. The collapsible rack assembly disclosed herein mounts within the rear cargo area bed, may be adjusted to fit the entire length of the rear cargo area bed, is easily reconfigurable to change from its collapsed configuration to its upright configuration and back again, and when in its collapsed position the components do not stack one upon the other. This allows the profile of the collapsible rack assembly described herein to be minimal.

Figure 1:
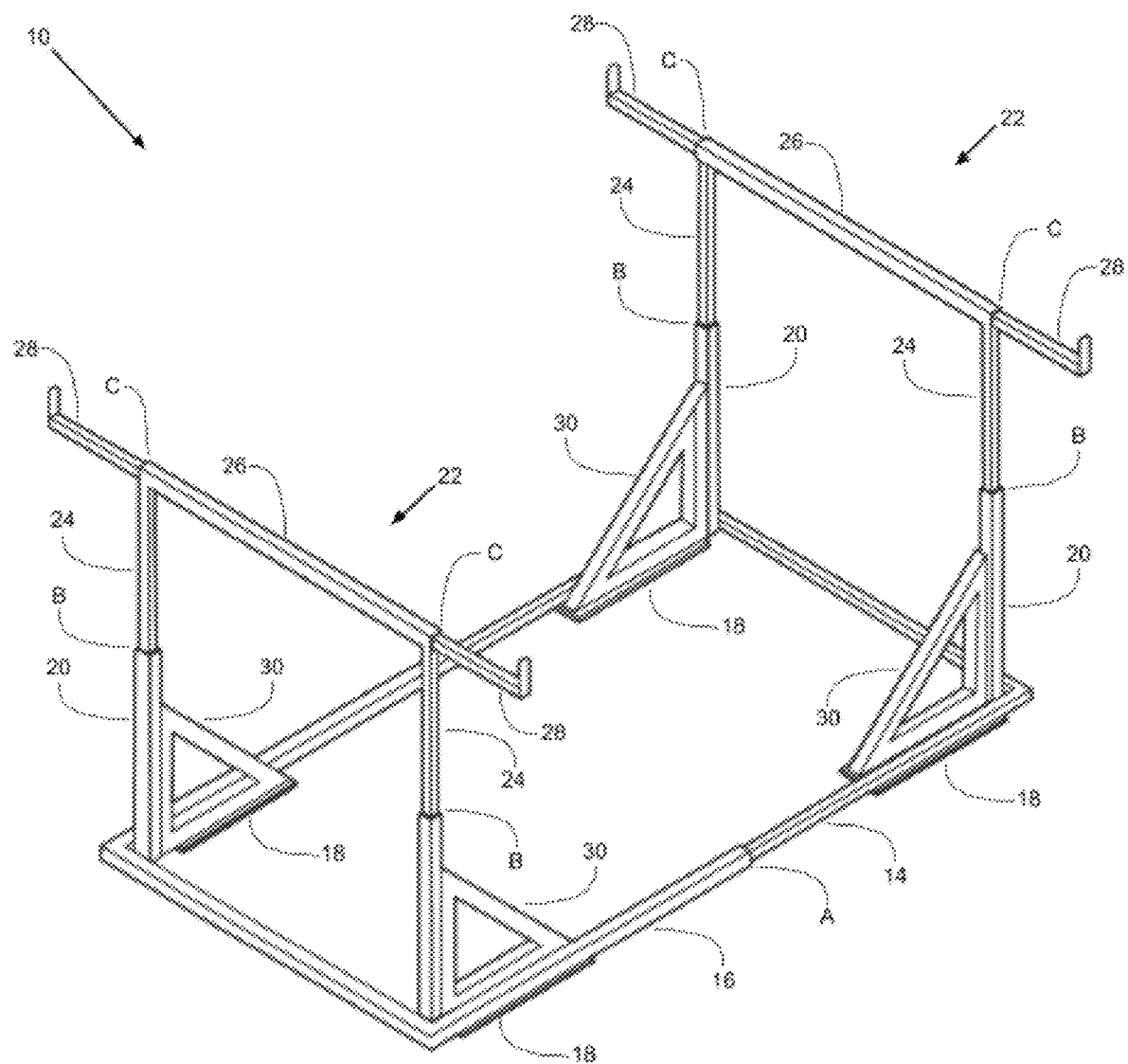
FIG. 1 shows the front top right isometric view of the collapsible rack assembly.
Figure 2:
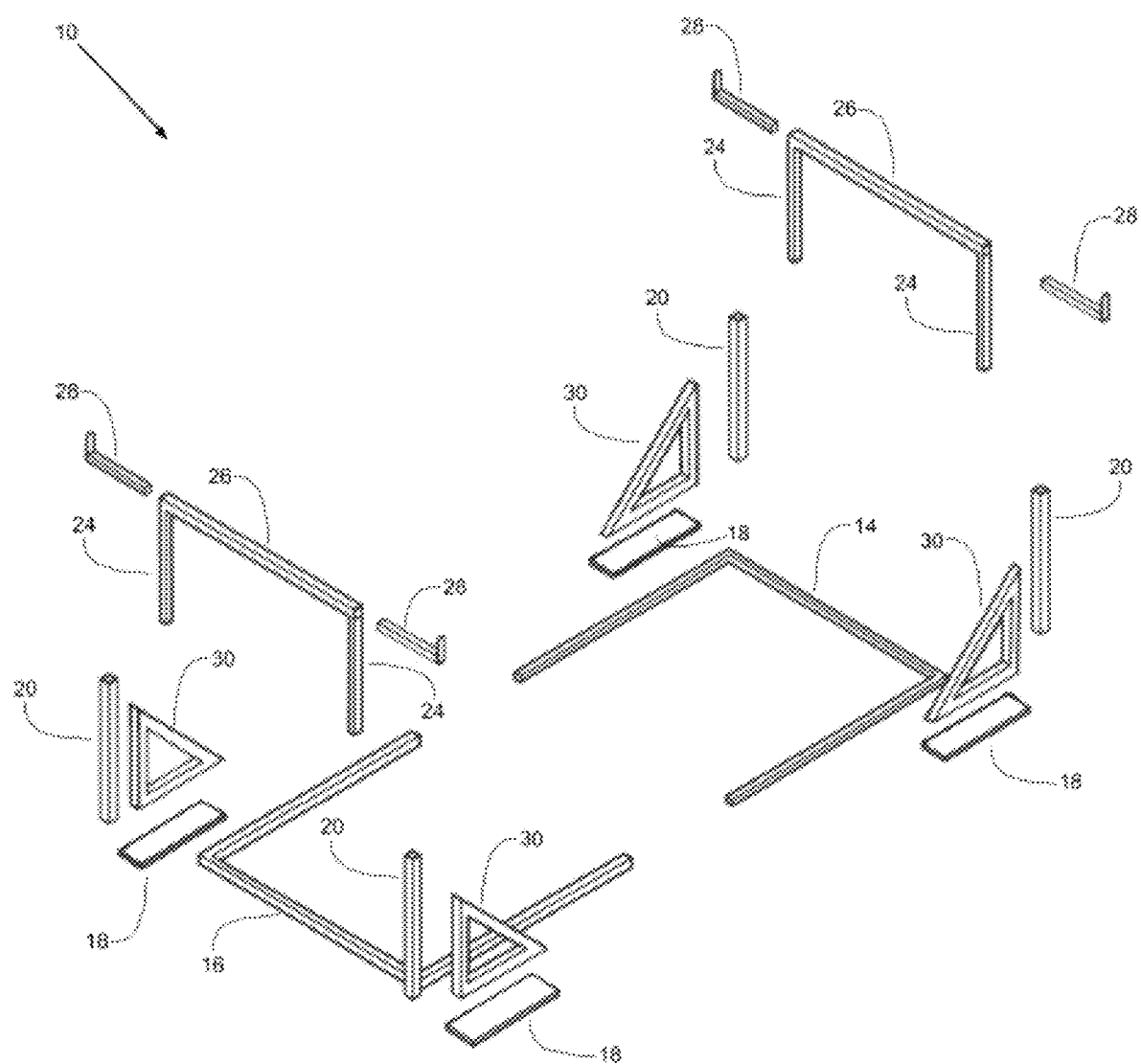
FIG. 2 shows the front top right exploded isometric view of the collapsible rack assembly.

Turning now to FIG. 1 we see an isometric view of collapsible rack assembly 10 as viewed from the top front right of collapsible rack assembly 10. The distal end of collapsible rack assembly 10 may also be referred to as the cab end as it is adjacent to the truck's cab. The proximal end of collapsible rack assembly 10 may also be referred to as the tail end as it is adjacent to the tail of the rear cargo area bed. The base of collapsible rack assembly 10 is generally rectangular and is comprised of two members: base frame inner member 14 and base frame outer member 16. Both of these members are similar in appearance as each has a supporting segment that joins two extension segments with the supporting segment occupying the width of the rear cargo area bed and the two extension segments positioned in parallel to the longitudinal axis of the rear cargo area bed. This is best seen in FIG. 2 which shows an exploded view of collapsible rack assembly 10. Both base frame inner member 14 and base frame outer member 16 are fabricated from hollow tubular components with base frame inner member 14 being fabricated from tubular components with slightly smaller dimensions. This allows the extension segments from base frame inner member 14 to be slidably inserted into the extension segments from base frame outer member 16. In FIG. 1, reference A shows where the extension segments from base frame inner member 14 have been slidably inserted into base frame outer member 16. By base frame inner member 14 being slidably insertable into base frame outer member 16, the distance between the supporting segment of base frame outer member 16 and base frame inner member 14 is adjustable and may accommodate varying lengths of a pickup truck's rear cargo area bed. In another embodiment of collapsible rack assembly 10, base frame outer member 16 and base frame inner member 14 may be combined into a single piece without eliminating any of the objectives of this invention other than the ability to vary in length.

Attached to base frame outer member 16 extension segments and base frame inner member 14 extension segments are flanges 18. Flanges 18 extend inwardly into the space surrounded by base frame outer member 16 or base frame inner member 14 to provide a base upon which to hingedly attach triangular braces 30. Triangular braces 30 are hingedly attached to flanges 18 inward edge as shown in FIG. 8. Triangular braces 30 are lowered inwardly into the space surrounded by base frame outer member 16 or base frame inner member 14 to enter into their collapsed state. This is shown in FIGS. 6 through 10. When triangular braces 30 are in their collapsed configuration, a gap is formed between triangular braces 30 and the extension segment they are attached to via flanges 18. Into this gap base frame legs 20, which are hingedly attached to the extension segment of either base frame outer member 16 or base frame inner member 14, may be lowered into when entering their collapsed configuration. Conversely, when base frame legs 20 are raised into their upright configuration, a gap is again formed between triangular braces 30 and the extension segment they are attached to via flanges 18. The base of triangular braces 30, when being raised into its upright configuration, will occupy this gap. When both triangular braces 30 and base frame legs 20 are in their upright configuration, they are releasably attached to one another by clamp, pins, or other means that are known to one skilled in the art. In so doing, triangular braces 30 provides load support to base frame legs 20 so that base frame legs 20 remain in their upright configuration. Each base frame legs 20 may be raised from its collapsed configuration to its upright configuration individually. Additionally, the two base frame legs 20 that are hingedly attached to base frame outer member 16 or base frame inner member 14 may be raised from their collapsed configuration to their upright configuration as a pair by the use of a support component connecting the pair of base frame legs 20.

Crossbeam assembly 22 is comprised of crossbeam horizontal member 26, crossbeam legs 24, and extension arms 28, For this disclosure, the outer dimensions of crossbeam legs 24 are such that they fit into the hollow interior found in base frame legs 20, but the reverse will also work. When a pair of base frame legs 20, hingedly attached to either base frame outer member 16 or base frame inner member 14, are in their upright configuration, crossbeam legs 24 may be slidably inserted into base frame legs 20 at reference B. Once crossbeam horizontal member 26 is at its desired height, the position of crossbeam legs 24 within base frame legs 20 may be set by clamps, pins, or other means that are known to one skilled in the art. Crossbeam legs 24 may be permanently affixed to crossbeam horizontal member 26. Crossbeam horizontal member 26 is hollow and may accommodate extension arms 28 on either side of crossbeam horizontal member 26. Although extension arms 28 are slidable within crossbeam horizontal member 26, they may be set at a particular position by clamps, pins, or other means that are known to one skilled in the art. When crossbeam assembly 22 has been raised into its upright configuration, extension arms 28 may be slid out of crossbeam horizontal member 26 at reference C and set at a position to accommodate the width of the load being supported by crossbeam assembly 22. The load may be supported by crossbeam assembly 22 at either the proximal or distal end of collapsible rack assembly 10 or by the two crossbeam assemblies 22, FIG. 2 shows the various components of collapsible rack assembly 10 arranged in an exploded view.

Figure 3:
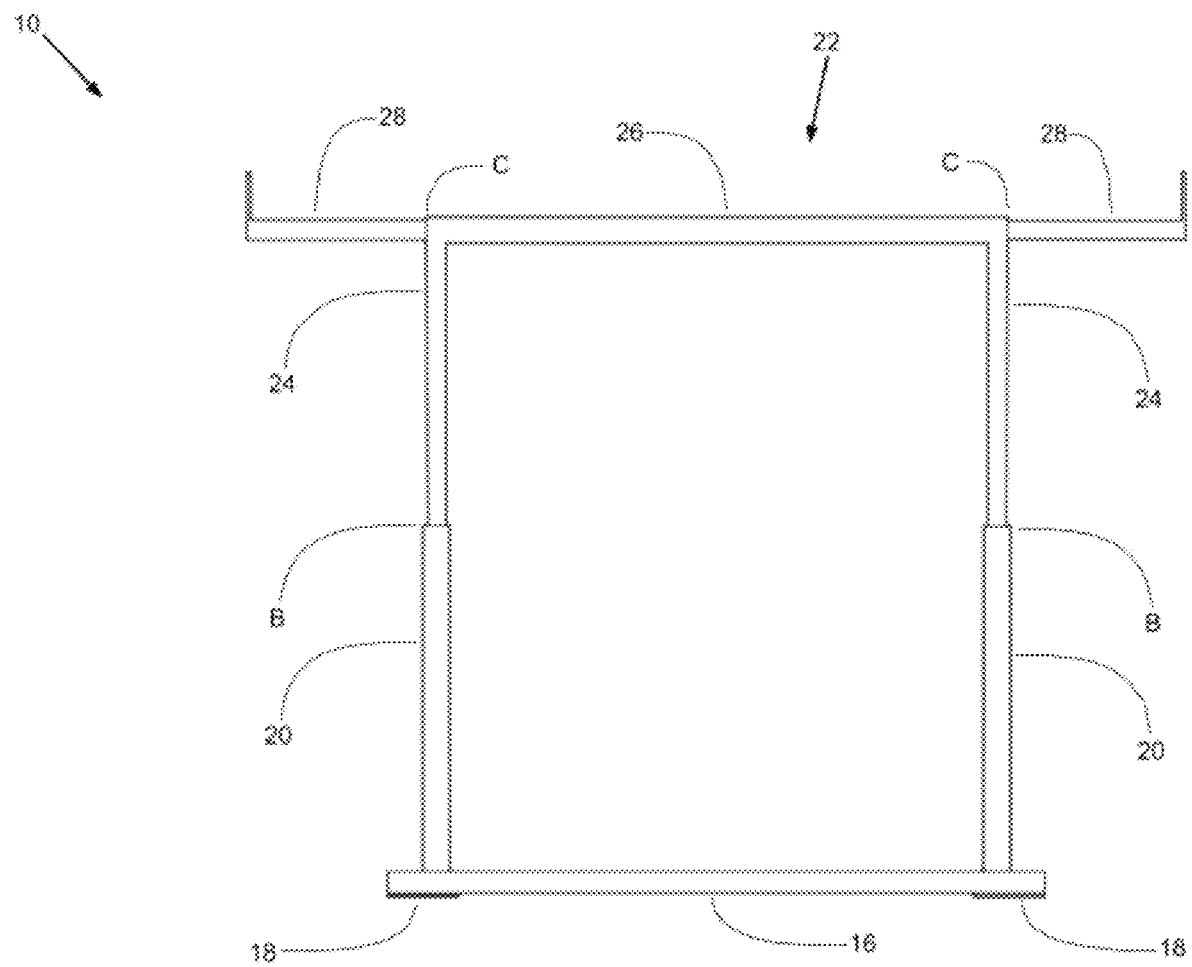
FIG. 3 shows the front view of the collapsible rack assembly, the rear view being the mirror image thereof.

FIG. 3 shows a front view of collapsible rack assembly 10 in its upright configuration. The front view of collapsible rack assembly 10 is a view of the proximal end or the tail end as it is adjacent to the tail of the rear cargo area bed. The front and rear views of collapsible rack assembly 10 are mirror images of each other. Visible in FIG. 3 is base frame outer member 16 supporting segment. In a rear view of collapsible rack assembly 10, the supporting segment of base frame inner member 14 would be visible. Below base frame outer member 16, flanges 18 are visible as they are attached to the bottom of both base frame outer member 16 extension segments. Flanges 18 hingedly support triangular braces 30 and when collapsible rack assembly 10 is in its upright configuration, triangular braces 30 are not visible as they are directly behind base frame legs 20. Crossbeam assembly 22, comprised of crossbeam legs 24, crossbeam horizontal member 26, and extension arms 28, is shown with crossbeam legs 24 having been inserted into base frame legs 20 at reference B. Crossbeam legs 24 are slidably insertable into base frame legs 20 so that the height of crossbeam horizontal member 26 from the floor of rear cargo area bed may vary. Once crossbeam horizontal member 26 has been set at its desired height, crossbeam legs 24 may be set within base frame legs 20 by using pins, clamps, or other means that are known to one skilled in the art. FIG. 3 shows extension arms 28 slid out from the hollow cavity of crossbeam horizontal member 26. Extension arms 28 may be slid out from the hollow cavity of crossbeam horizontal member 26 at reference C to a position and the position may be set by pins, clamps, or other means that are known to one skilled in the art.

Figure 4:
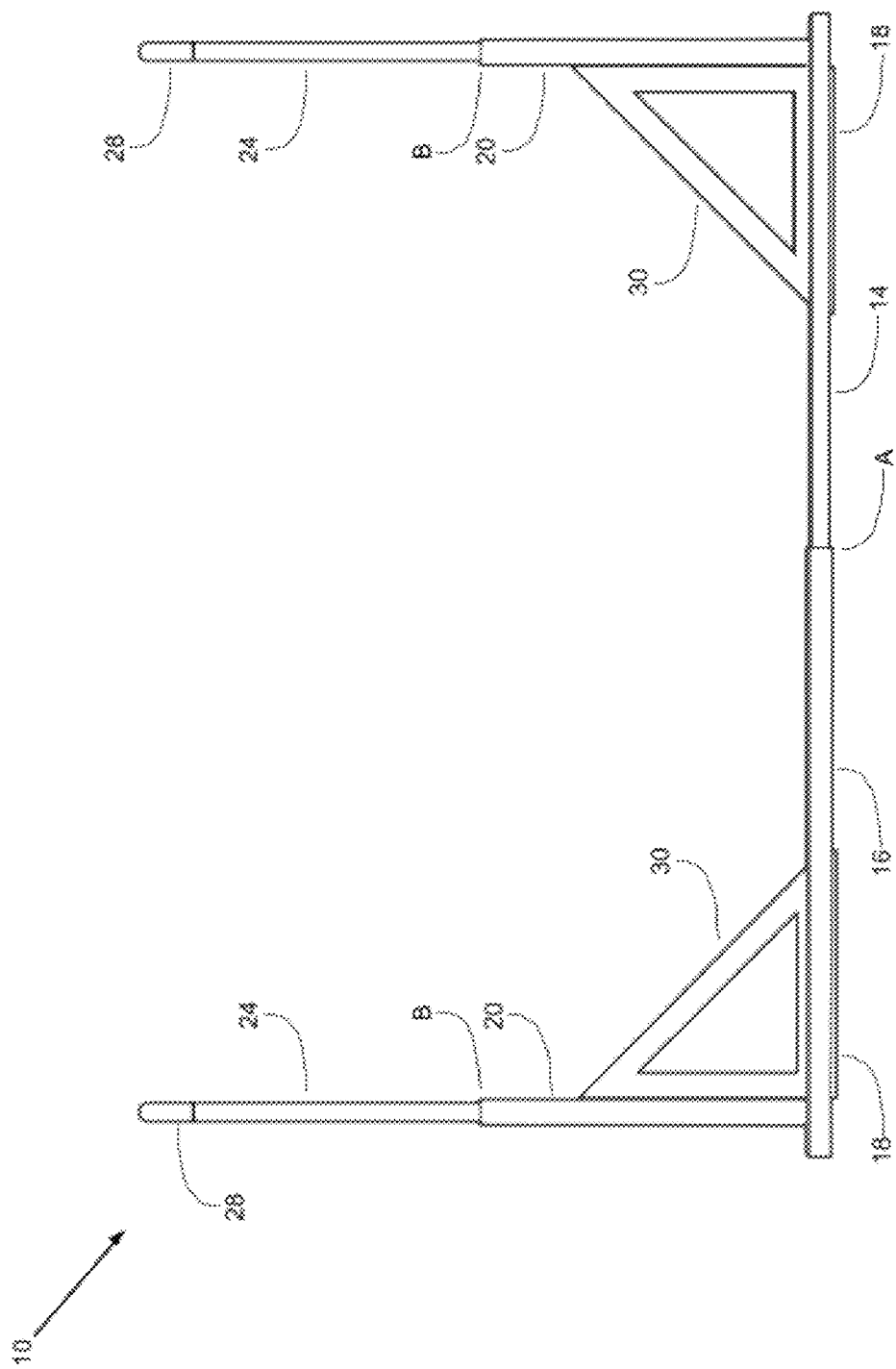
FIG. 4 shows the right side view of the collapsible rack assembly, the left side being the mirror image thereof.

FIG. 4 shows a right side view of collapsible rack assembly 10 in its upright configuration. The right side view of collapsible rack assembly 10 is a view of collapsible rack assembly 10 from the passenger side of the pickup truck where collapsible rack assembly 10 has been installed. In FIG. 4, the left side of collapsible rack assembly 10 would be the proximal end of collapsible rack assembly 10 while the right side would be the distal end. The right side and the left side views of collapsible rack assembly 10 are mirror images of each other. Supporting collapsible rack assembly 10 is base frame outer member 16 and base frame inner member 14. Shown here in FIG. 4 are the extension segments of base frame outer member 16 and base frame inner member 14. Base frame inner member 14 has dimensions slightly smaller than base frame outer member 16 so that base frame inner member 14 may be slidably inserted into base frame outer member 16 at reference A. Flanges 18 are attached to the extension segments of base frame outer member 16 and base frame inner member 14 to hingeably support triangular braces 30. When in its upright configuration, triangular braces 30 vertically supports base frame legs 20 and are releasably attached to base frame legs 20 by a pin, clamp, or other means that are known to one skilled in the art. Base frame legs 20 have a hollow cavity into which crossbeam legs 24 may be inserted at reference B. Crossbeam legs 24 may be adjustably set into base frame legs 20 by pins, clamps, or other means that are known to one skilled in the art. Also visible in FIG. 4 are extension arms 28 appearing above crossbeam legs 24 and hiding crossbeam horizontal member 26.

Figure 5:
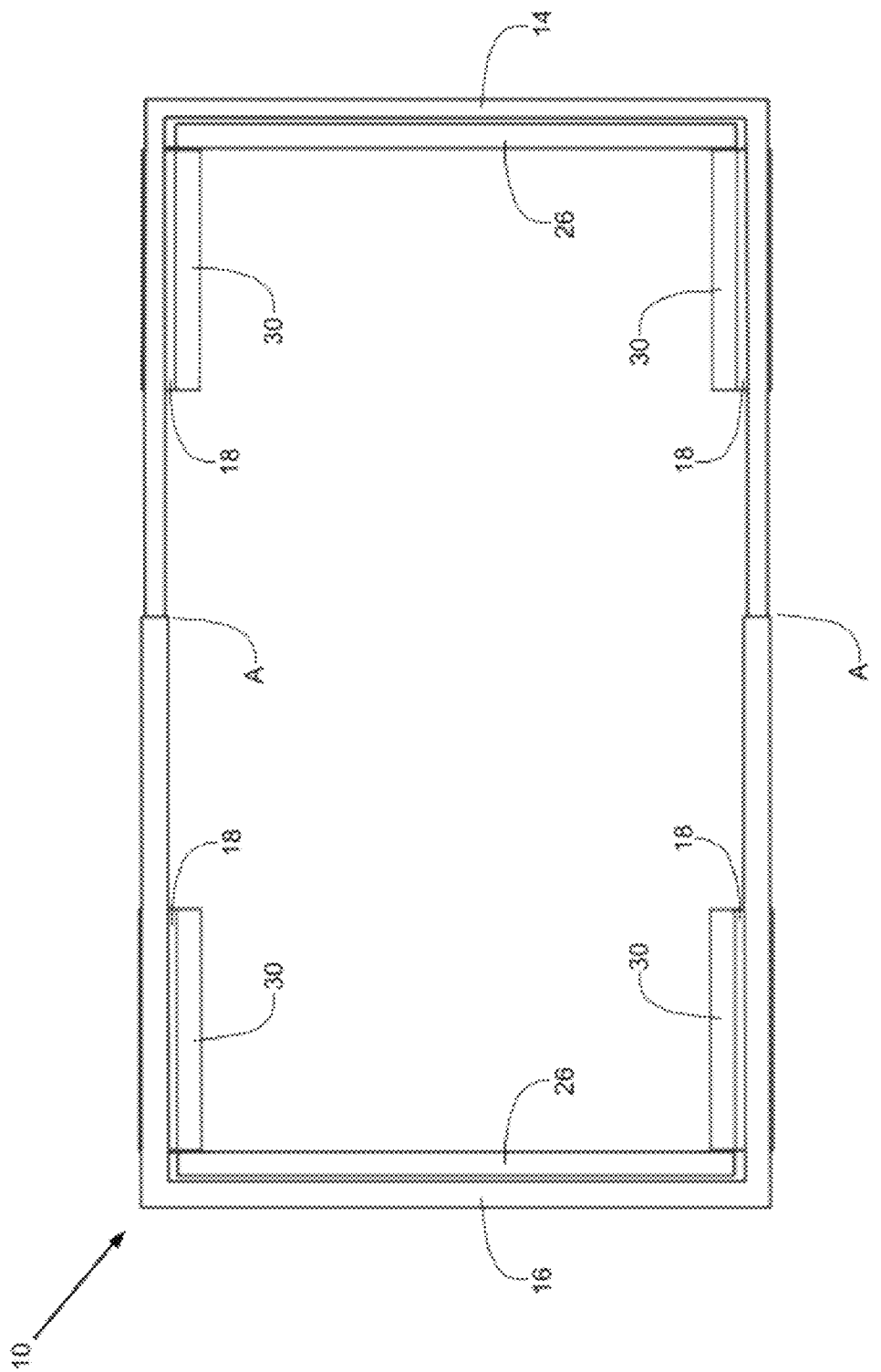
FIG. 5 shows the top view of the collapsible rack assembly.

FIG. 5 shows a top view of collapsible rack assembly 10 in its upright configuration with all four extension arms 28 collapsed into crossbeam horizontal member 26. Supporting collapsible rack assembly 10 are base frame outer member 16 and base frame inner member 14 with the supporting segment appearing in FIG. 5 as the vertical element of base frame outer member 16 and base frame inner member 14 while the extension segments are the two horizontal segments attached to the supporting segment at either end of the supporting segment. Base frame inner member 14 has dimensions slightly smaller than base frame outer member 16 so that base frame inner member 14 may be slidably inserted into base frame outer member 16 at reference A. Base frame outer member 16 and base frame inner member 14 are mounted to the pickup truck's rear cargo area bed. As base frame inner member 14 is slideably insertable into base frame outer member 16, collapsible rack assembly 10 may accommodate a variety of rear cargo area bed lengths. For longer rear cargo area beds, it is not required that base frame inner member 14 be slideably insertable into base frame outer member 16 as these two components do not have to be connected for the enablement of collapsible rack assembly 10. Visible in FIG. 5 are the four flanges 18 that are attached to the extension segments of base frame outer member 16 and base frame inner member 14 to hingeably support triangular braces 30, The hinges allow triangular braces 30 to be lowered into the area enclosed by base frame outer member 16 and base frame inner member 14 when in its collapsed configuration. When triangular braces 30 are lowered into their collapsed configuration, a gap will exist between the base of triangular braces 30 and the adjacent edge of the extension segment. This gap opens a space for base frame legs 20 to be lowered into when entering its collapsed configuration. Extension arms 28 may slide in or out from the hollow cavity of crossbeam horizontal member 26 to a position and the position may be set by pins, clamps, or other means that are known to one skilled in the art. By so adjusting the position of extension arms 28, loads of greater width than crossbeam horizontal member 26 may be accommodated.

Figure 6:
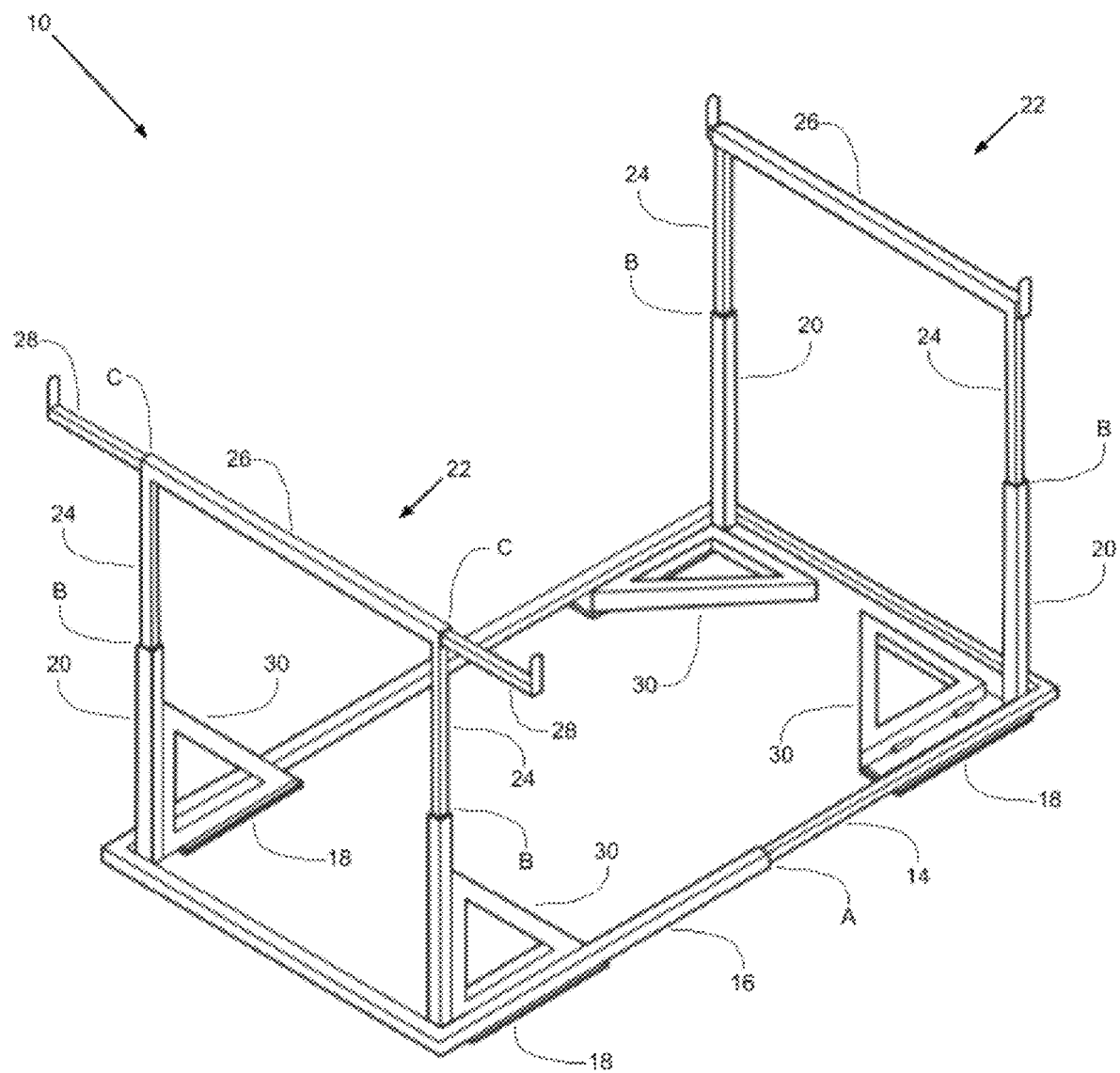
FIG. 6 shows the front top right isometric view of the collapsible rack assembly with the distal end showing the triangular braces being in their collapsed state and the extension arms being fully retracted within the crossbeam horizontal member.
Figure 7:
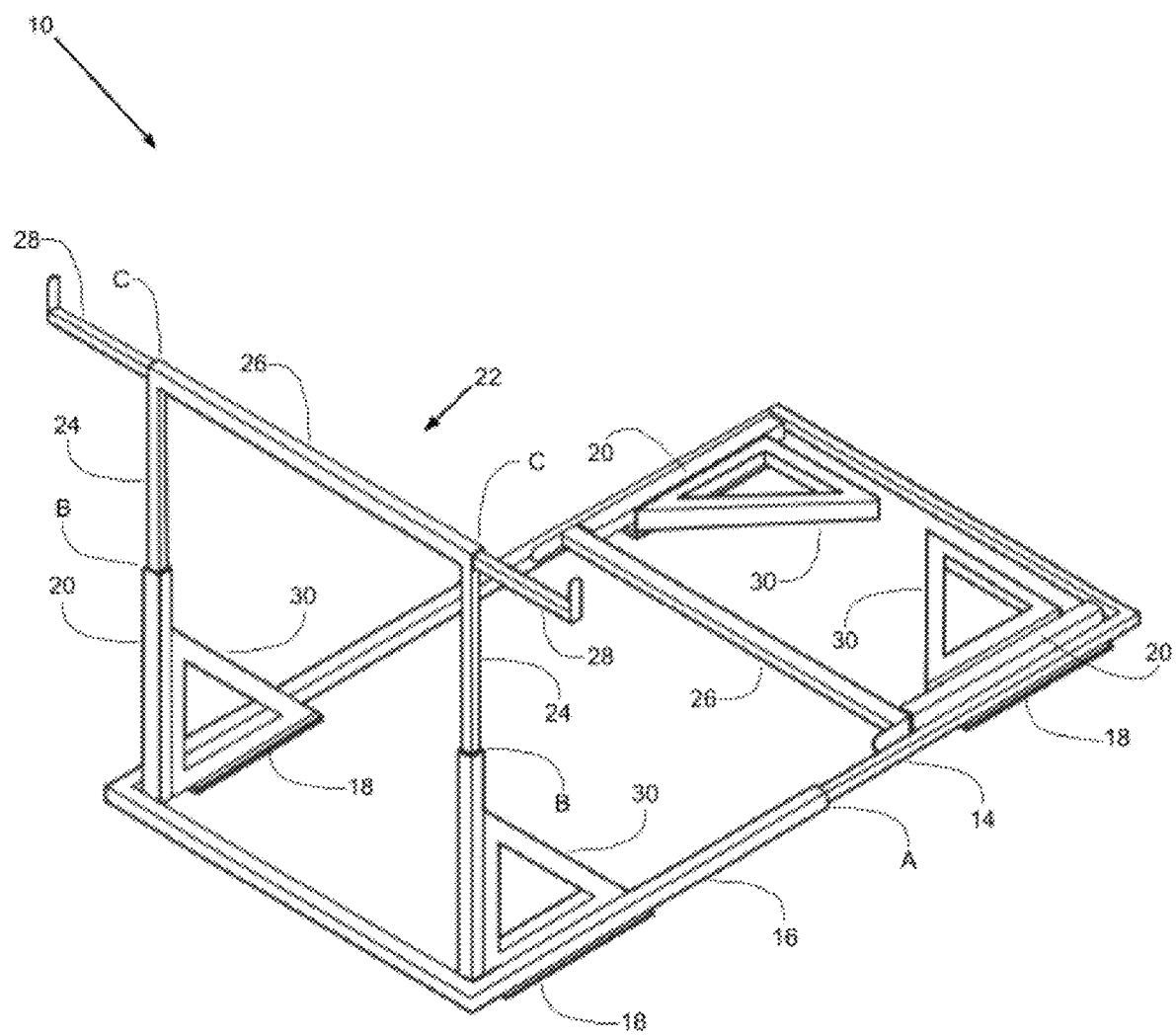
FIG. 7 shows the front top right isometric view of the collapsible rack assembly with the distal end being fully collapsed, illustrating how the collapsible rack assembly may collapse into a single layer.
Figure 8:
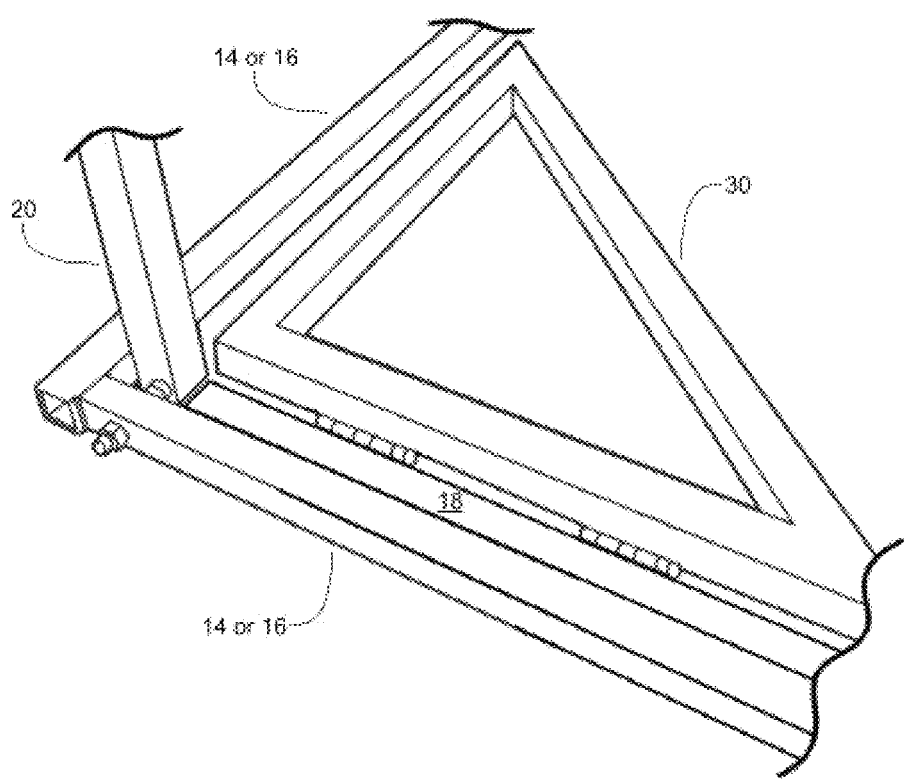
FIG. 8 shows a perspective detail view of the collapsible rack assembly of FIG. 1 showing the gap formed for the base frame legs to be lowered into when the triangular braces are in their collapsed state.

FIGS. 6 and 7 show the steps involved in reconfiguring collapsible rack assembly 10 from its upright configuration to its collapsed configuration. In FIGS. 6 and 7, only the distal end of collapsible rack assembly 10 is moved into its collapsed configuration. The proximal end of collapsible rack assembly 10 is left in its uptight configuration for comparison. The reverse of these steps will be required to reconfigure collapsible rack assembly 10 from its collapsed configuration to its upright configuration. In FIG. 6, the operator of collapsible rack assembly 10 will first fully insert extension arms 28 into crossbeam horizontal member 26. Next, the operator will disengage triangular braces 30 from base frame legs 20 and lower them into their collapsed configuration. The lowering of triangular braces 30 to their collapsed configuration will form a gap between the base of triangular braces 30 and their adjacent extension segment. In FIG. 7 the operator will lower crossbeam assembly 22 along with base frame legs 20 into their collapsed configuration completing the reconfiguration process from upright to collapsed.

FIG. 8 shows a perspective detail view of triangular brace 30 in its collapsed configuration. Between the base of triangular brace 30 and the extension segment of base frame inner member 14, a gap has been formed by the act of lowering triangular brace 30 into its collapsed configuration. As the width of triangular brace 30 is at least the width of base frame leg 20, this gap is sufficiently wide enough for base frame leg 20, which is hingeably attached to base frame inner member 14, to enter when being lowered into its collapsed configuration. Note that the base frame in FIG. 8 may be either base frame outer member 16 at the proximal end or base frame inner member 14 at the distal end of collapsible rack assembly 10.

Figure 9:
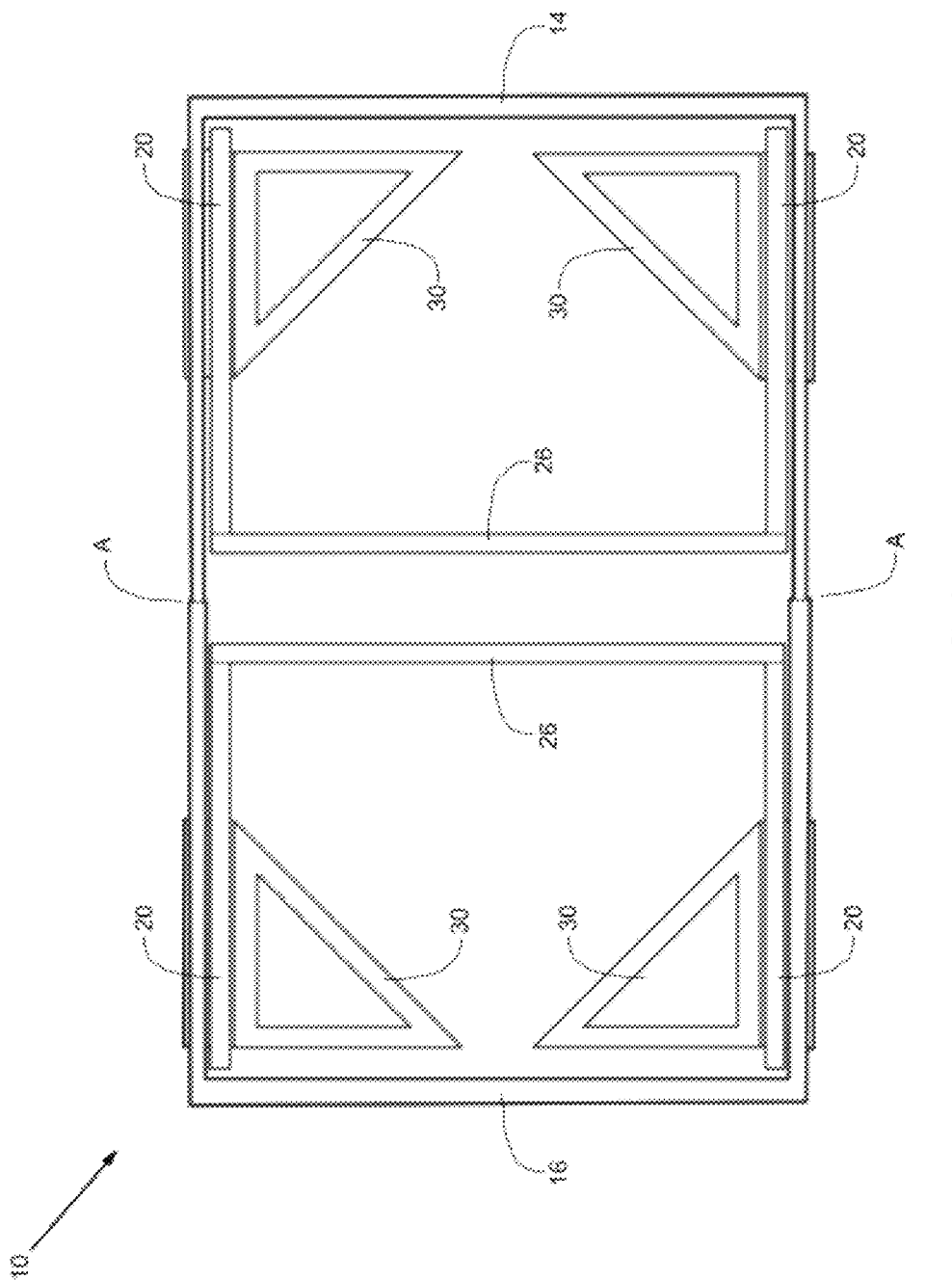
FIG. 9 shows the top view of the collapsible rack assembly in its collapsed state.
Figure 10:
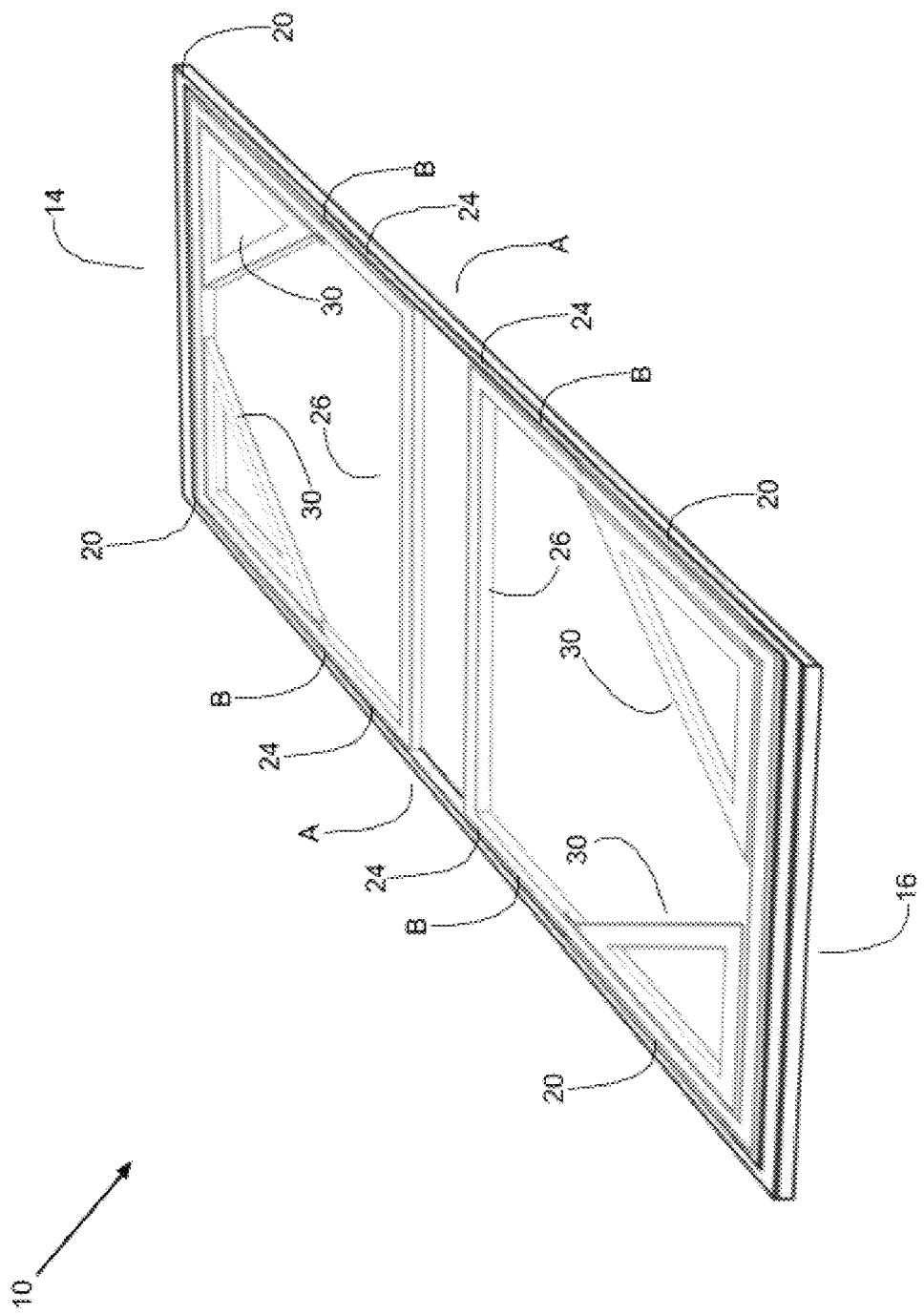
FIG. 10 shows the isometric view of the collapsible rack assembly in its collapsed state.
Figure 11:
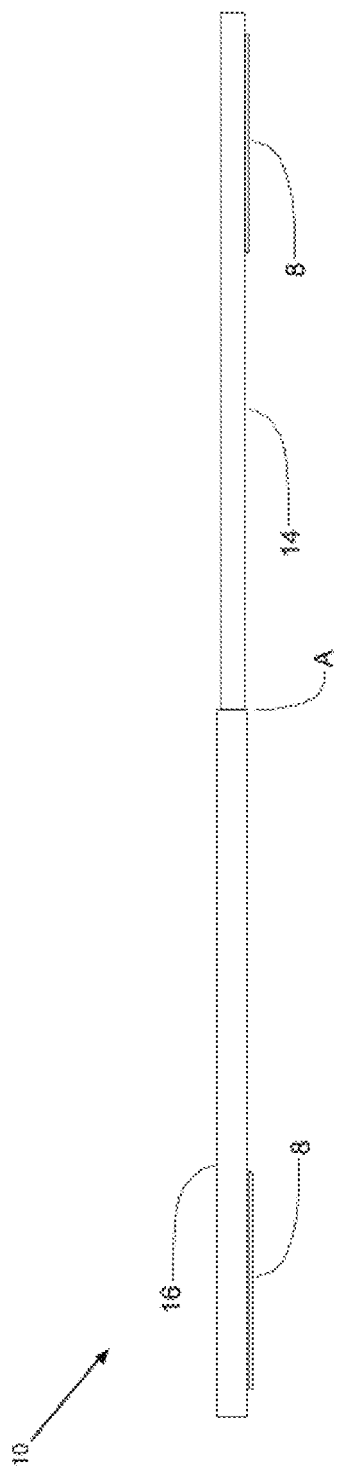
FIG. 11 shows the right side view of the collapsible rack assembly in its collapsed state, the left side being the mirror image thereof.

FIG. 9 shows a top view of collapsible rack assembly 10 in its collapsed configuration. In its collapsed configuration, base frame outer member 16, base frame inner member 14, triangular braces 30, base frame legs 20, and crossbeam assembly 22 all come to rest in a single plane. Only flanges 18 add to the height of collapsible rack assembly 10. In its collapsed configuration, base frame outer member 16 and base frame inner member 14 form the outer boundary of collapsible rack assembly 10. If the pickup truck's rear cargo area bed is longer than the combined lengths of base frame outer member 16 and base frame inner member 14 extension segments, then base frame inner member 14 may not be inserted into base frame outer member 16. However, if base frame outer member 16 and base frame inner member 14 are roughly aligned, this will not present a problem as long as the length of load to be supported by crossbeam assembly 22 is greater than the length between the proximal crossbeam assembly 22 and the distal crossbeam assembly 22. Even so, the operator of collapsible rack assembly 10 is not required to use the entire length of the rear cargo area bed and may assemble collapsible rack assembly 10 so that it occupies less than the full length of the rear cargo area bed. FIG. 10 shows an isometric view of collapsible rack assembly 10 in its collapsed configuration while FIG. 11 shows a side view of collapsible rack assembly 10 in its collapsed configuration.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed and that that scope shall not be restricted, except in the light of the appended claims and their equivalents.

What is claimed is:

1. A collapsible rack assembly for use on a vehicle having a flat bed to carry longer loads such as pipes or a ladder, the rack comprising:
    a linearly elongated tubular rectangular frame having a proximal end opposite a distal end the frame comprised of:
        two support segments opposite each other at the proximal and the distal end, and
        two extension segments opposite each other and joining said support segments;
    four tubular legs hingedly attached to said extension segments and movable in a plane perpendicular to said frame, one leg at the proximal end and one leg at the distal end of each said extension segment;

four rectangular flanges that protrudes the distance of at least the diameter of said leg into the space enclosed by said frame, each flange is attached to the bottom of said extension segments, one flange at the proximal end and one flange at the distal end of each said extension segments;

four braces each hingedly attached to each said flanges along the edge that protrudes into the space enclosed by said frame;

two crossbeam assemblies, one at the proximal end and the other at the distal end of said frame, each crossbeam assembly having:
one tubular horizontal member; and
two vertical members such that each vertical member may be slideably inserted into said legs at either the proximal end or the distal end of said frame to mount the crossbeam assembly into said frame.

2. The collapsible rack assembly of claim 1 further comprising arms that are slideably insertable into either end of said horizontal member.

3. The collapsible rack assembly of claim 1 wherein said braces are right-angle triangles.

4. The collapsible rack assembly of claim 1 wherein said frame is divided perpendicular along its longitudinal axis into two halves with said extension segments of one half capable of being slideably inserted into the extension segments of the other half.

5. A collapsible rack assembly for use on a vehicle having a flat bed to carry longer loads such as pipes or a ladder, the rack comprising:

a linearly elongated tubular rectangular frame having a proximal end opposite a distal end the frame comprised of:
one support segment at the distal end, and
two extension segments opposite each other and joining said support segment;

two tubular legs hingedly attached to said extension segments and movable in a plane perpendicular to said frame, one leg at the distal end of each said extension segment;

two rectangular flanges that protrudes the distance of at least the diameter of said leg into the space enclosed by said frame, each flange is attached to the bottom of the distal end of said extension segments;

two braces each hingedly attached to each said flanges along the edge that protrudes into the space enclosed by said frame;

one crossbeam assembly at the distal end of said frame, said crossbeam assembly having:
one tubular horizontal member; and
two vertical members such that each vertical member may be slideably inserted into said legs at the distal end of said frame to mount the crossbeam assembly into said frame.

6. The collapsible rack assembly of claim 5 further comprising arms that are slideably insertable into either end of said horizontal member.

7. The collapsible rack assembly of claim 5 wherein said braces are right-angle triangles.

* * * * *